United States Patent [19]

Matsunaga et al.

[11] 4,405,376

[45] Sep. 20, 1983

[54] TITANIUM DIOXIDE PIGMENT AND PROCESS FOR PRODUCING SAME

[75] Inventors: Mamoru Matsunaga; Teruo Usami; Haruo Okuda; Hideo Futamata, all of Yokkaichi, Japan

[73] Assignee: Ishihara Sangyo Kaisha, Ltd., Osaka, Japan

[21] Appl. No.: 321,706

[22] Filed: Nov. 16, 1981

[30] Foreign Application Priority Data

Nov. 18, 1980 [JP] Japan ................. 55-162373

[51] Int. Cl.³ ............................... C09C 1/36
[52] U.S. Cl. ................. 106/300; 106/308 B; 106/308 N; 106/308 Q
[58] Field of Search .................. 106/300, 308 B, 299, 106/308 N, 308 Q

[56] References Cited

U.S. PATENT DOCUMENTS 3,383,231  5/1968  Allan ................................ 106/300
3,853,575 12/1974  Holle et al. ..................... 106/300
4,086,100  4/1978  Esselborn et al. ............... 106/300
4,328,040  5/1982  Panek et al. .................... 106/300

FOREIGN PATENT DOCUMENTS 8101  2/1980  European Pat. Off.
1022621  3/1966  United Kingdom ............. 106/300
1368601 10/1974  United Kingdom ............. 106/300

Primary Examiner—Helen M. McCarthy
Attorney, Agent, or Firm—Cushman, Darby & Cushman

[57] ABSTRACT

This invention provides a titanium dioxide pigment improved in durability and dispersibility which comprises pigmentary titanium dioxide core particle, an inner coating of hydrous oxides of tin and zirconium and an outer coating of hydrous oxide of aluminum, and a process for producing said titanium dioxide pigment.

22 Claims, No Drawings

TITANIUM DIOXIDE PIGMENT AND PROCESS FOR PRODUCING SAME

This invention relates to a titanium dioxide pigment coated with hydrous oxides of tin, zirconium and aluminum and improved in durability and dispersibility, as well as to a process for producing said titanium dioxide pigment.

Recently, the application of the higher finished coatings are increasing as seen in automobiles, domestic electrical articles, industrial articles and the like. As the titanium dioxide pigment used in the coatings, a pigment having an excellent photochemical stability (to say durability) and an ability to impart a high gloss to the coating is intensely required. With regard to the development of a titanium dioxide pigment capable of satisfying these performances, a variety of proposals have been made hitherto. For example, coating the pigment with dense amorphous silica together with other inorganic compounds is known as the most effective method for imparting durability. Though this titanium dioxide pigment is excellent in durability, it is insufficient in gloss of coating, and particularly in the case of water born paints its application is sometimes restricted. Further, there is also known another proposal to make the aforementioned improvement without coating the pigment with said dense amorphous silica. Although the durability is improved by this method, gloss and dispersibility can be deteriorated, so that the aforementioned improvement is not yet fully achieved by this proposal.

It is the object of this invention to provide a titanium dioxide pigment improved in durability without deteriorating gloss and dispersibility.

The present inventors have found that a coated titanium dioxide pigment in which the titanium dioxide particles have coated thereon a given amount of inorganic compounds in a specific combination is excellent in both durability and gloss, and its pigment properties such as color tone, hiding power, dispersibility and so on are not deteriorated.

According to this invention, there is provided a titanium dioxide pigment which comprises (1) a pigmentary titanium dioxide core particle, (2) an inner coating of 0.1–3% by weight of hydrous tin oxide and 0.1–5% by weight of hydrous zirconium oxide, both based on the weight of said core particle and calculated as $SnO_2$ and $ZrO_2$, respectively, and (3) an outer coating of 0.1–8% by weight of hydrous aluminum oxide, based on the weight of said core particle and calculated as $Al_2O_3$.

As referred to in this invention, the term "pigmentary titanium dioxide core particle" means usual pigmentary powder having a mean particle size of about 0.1–0.3μ and a good whiteness, the crystal form of which may be any of anatase and rutile, and may also be a mixture thereof. The titanium dioxide core may be any of the product of the so-called sulfate process, according to which a titanium sulfate solution is hydrolyzed, and the product of the so-called chloride process, according to which a titanium halide is oxidized in the vapor phase. When the titanium dioxide prepared by the sulfate process is used, it is preferred that the hydrous titanium dioxide formed by the hydrolysis is calcined in the presence of phosphorus or a metal such as zinc, potassium, aluminum, lithium, niobium, magnesium, or the like, to obtain stabilized crystals of the titanium dioxide.

In this invention, the amount of inorganic compounds coated on the surface of titanium dioxide core particles is as follows: As the inner coating, hydrous tin oxide is used in an amount of 0.1–3%, preferably 0.2–1.5% and particularly preferably 0.3–1.0%, by weight calculated as $SnO_2$, and hydrous zirconium oxide is used in an amount of 0.1–5%, preferably 0.3–3% and particularly preferably 0.5–2%, by weight calculated as $ZrO_2$, based on the weight of core particle. As the outer coating, hydrous aluminum oxide is used in an amount of 0.1–8%, preferably 0.3–5% and particularly preferably 0.5–3% by weight, calculated as $Al_2O_3$ on the same basis. If the amount of hydrous tin oxide coated is less than the above-mentioned range, the durability effect intended in this invention is not obtained. The use of too large an amount is also undesirable in that discoloration of titanium dioxide pigment can occur and it is disadvantageous economically, too. If the amount of hydrous zirconium oxide coated is less than the above-mentioned range, no improvement in durability can be expected. If it is too large, the gloss is decreased and an economical disadvantage arises.

If the amount of hydrous aluminum oxide coated is less than the above-mentioned range, the decrease in durability, gloss and dispersibility is unavoidable, which is undesirable. If it is too large, an effect proportional to the amount cannot be expected, and furthermore there is a decrease particularly in gloss. In this invention, it is more preferable that the amounts of the hydrous oxides of tin, zirconium and aluminum coated fall in the above-mentioned ranges and their weight ratio of $SnO_2:ZrO_2:Al_2O_3$ is 1:1–3:1–8 and particularly 1:1–2:2–6. In this invention, the coating on the core particle is in the state that the outer coating is present around the inner coating. They may be in the form of either a continuous coated layer or a discontinuous coated layer.

In this invention, organic agents such as polyols, alkanolamines and the like or inorganic compounds such as silicon, titanium, zinc, antimony, cerium and the like may optionally be coated to be present on the pigment unless they adversely affect the fundamental characteristics of this invention.

The titanium dioxide pigment of this invention is excellent in dispersibility, gloss and durability, and is useful as a colorant in various fields such as coating material, ink, plastics, paper and the like. Particularly, it is quite suitable for use not only as a colorant in solvent type coating materials for the higher finished coating requiring high gloss, durability and excellent pigment dispersibility, but also as a colorant in water soluble type coating materials.

Further, this invention provides a process for producing a coated titanium dioxide pigment by the following steps:

In producing the pigment of this invention, soluble compounds of tin and zirconium are first added to an aqueous slurry of pigmentary titanium dioxide core particles and neutralized with an acid or an alkali, whereby the hydrous oxides of tin and zirconium are precipitated on the surface of titanium oxide to form an inner coating. The pigment concentration of the aqueous titanium dioxide slurry is usually 100–800 g/liter and preferably 200–400 g/liter, and its temperature is maintained at 50°–90° C. and preferably 60°–80° C. To this aqueous slurry of titanium dioxide were added the desired quantities, based on the weight of the core particles, of the water soluble compounds of tin and zirconium. As said water soluble compound of tin, there may be used acidic compounds such as tin chloride, tin sulfate, tin acetate, tin oxychloride, potassium stannate and the like, as well as sodium stannate and the like. As said water soluble compounds of zirconium, there may be used acidic compounds such as zirconium chloride, zirconium sulfate, zirconium nitrate, zirconium acetate, zirconium carbonate, zirconium oxychloride, zirconium oxysulfate and the like. In order to precipitate the coating agent thus added to the aqueous slurry of titanium dioxide, in the form of a hydrous oxide onto the surface of said core particles, the pH value of the slurry is adjusted to 6-8 by adding an acidic compound when the slurry is alkaline (Example 3) or adding an alkaline compound when the slurry is acidic (Examples 1, 2, 4 and 5).

In the process of this invention, the inner coating may be formed by simultaneously precipitating hydrous oxides of tin and zirconium, or it may also be formed by precipitating at least a portion of them separately and then precipitating the remainders simultaneously, or separately precipitating the whole of them. However, a desirable effect on durability can, in some case, be brought about by, for example, adding a water soluble tin compound to an aqueous slurry of core particles, adjusting the pH of the slurry so that at least a part of the tin first precipitates as a hydrous oxide onto the surface of the particles, and then adding a water soluble zirconium compound and adjusting the pH of the slurry so that a hydrous oxide of zirconium precipitates to form an inner coating. As said acidic compound used as neutralizing agent, there may be mentioned sulfuric acid, hydrochloric acid and the like. As said alkaline compounds, there may be used hydroxides and carbonates of alkali metals and alkaline earth metals, as well as ammonia, amines and the like. The slurry neutralized is aged for a predetermined period of time (usually 10-60 minutes) at a temperature of 40°-90° C.

Then, a given quantity of water soluble aluminum compound is added to the slurry having been subjected to the above-mentioned inner coating treatment, and it is neutralized with an acid or an alkali, whereby hydrous aluminum oxide precipitates to form the outer coating. As said soluble aluminum compound, there may be used alkali aluminate, aluminum chloride, aluminum sulfate and the like. In order to precipitate the added aluminum compound as a hydrous oxide onto said core particles, the pH is adjusted to 6-8 by neutralizing it with an acid or alkali in the same manner as above.

The titanium dioxide pigment slurry which has been subjected to coating treatment as mentioned above is aged for a given period of time (usually 10-60 minutes) at a temperature of 40°-90° C., filtered and washed, then dried, and then subjected to the usual pulverization treatment to obtain a product of titanium dioxide pigment.

EXAMPLE 1

An aqueous slurry of titanium dioxide core particles prepared by oxidizing titanium tetrachloride in the vapor phase ($TiO_2$ concentration 400 g/liter) was heated to 70° C., and the pH value of the slurry was adjusted to 2 by adding sulfuric acid. Then, a solution of stannous chloride was added in an amount of 0.5% by weight based on the weight of the core particles and calculated as $SnO_2$, and the resulting mixture was stirred for 10 minutes, after which a solution of zirconium sulfate was added in an amount of 0.7% by weight, on the same basis as above and calculated as $ZrO_2$, and the resulting mixture was stirred for 10 minutes. Subsequently, the pH value of the slurry was adjusted to 7 by adding a solution of sodium hydroxide to precipitate hydrous oxides of tin and zirconium on the surface of the core particles. After stirring the mixture for 10 minutes, a solution of sodium aluminate was added in an amount of 2.5% by weight as calculated as $Al_2O_3$, and the resulting mixture was stirred for 10 minutes, and the pH value of the slurry was adjusted to 7 by adding sulfuric acid, whereby hydrous aluminum oxide precipitated. Then, the mixture was aged for 60 minutes, filtered, washed, dried at 120° C. for 5 hours and pulverized by means of a micronizer to obtain a titanium dioxide pigment coated with the oxides of tin, zirconium and aluminum, which is within the scope of this invention (pigment A).

EXAMPLE 2

Another titanium dioxide pigment which is within the scope of this invention (pigment B) was prepared by repeating the coating treatment of Example 1, except that a rutile type titanium dioxide produced by hydrolyzing a solution of titanium sulfate into hydrous titanium oxide, calcining, pulverizing and classifying was used as the titanium dioxide and a solution of stannic chloride was used as the tin chloride solution.

EXAMPLE 3

A further titanium dioxide pigment which is within the scope of this invention (pigment C) was produced by repeating the coating treatment of Example 1, except that the procedure was altered so that the solution of zirconium sulfate was added while maintaining the pH value of slurry at 10-10.5 and then the solution of stannous chloride was added.

EXAMPLE 4

A further titanium dioxide pigment which is within the scope of this invention (pigment D) was produced by repeating the coating treatment of Example 1, except that, after addition of the stannous chloride solution, the pH value of the slurry was adjusted to 7 by adding a solution of sodium hydroxide, the mixture was stirred for 10 minutes and then the zirconium sulfate was added.

EXAMPLE 5

A still further titanium dioxide pigment which is within the scope of this invention (pigment E) was produced by repeating the coating treatment of Example 1, except that the stannous chloride solution was added in an amount of 1% by weight as calculated as $SnO_2$ and the zirconium sulfate solution was added in an amount of 2% by weight as calculated as $ZrO_2$, both based on the weight of core particles.

COMPARATIVE EXAMPLES

For comparison with the pigments of this invention of Examples 1-5, pigments F-N were produced in the following manner:

F: The treatment of Example 1 was repeated, except that the coating with hydrous tin oxide was omitted.
G: The treatment of Example 1 was repeated, except that the coating with hydrous zirconium oxide was omitted.

H: The treatment of Example 1 was repeated, except that the coating with hydrous aluminum oxide was omitted.

I: The treatment of Comparative Example H was repeated, except that the hydrous tin oxide was coated in an amount of 5% by weight as calculated as $SnO_2$, and the hydrous zirconium oxide was coated in an amount of 1% by weight as calculated as $ZrO_2$.

J: The treatment of Example 1 was repeated, except that a solution of sodium silicate was substituted for the solution of stannous chloride and hydrous silicon oxide was coated in an amount of 0.5% by weight as calculated as $SiO_2$.

K: The treatment of Example 1 was repeated, except that an ortho-phosphoric acid solution was substituted for the solution of stannous chloride and hydrous phosphorus oxide was coated in an amount of 0.5% by weight as calculated as $P_2O_5$.

L: The treatment of Example 1 was repeated, except that a solution of titanium tetrachloride was substituted for the solution of stannous chloride and the hydrous titanium oxide was coated in an amount of 1% by weight as calculated as $TiO_2$.

M: The treatment of Example 1 was repeated, except that a solution of cerium chloride was substituted for the hydrous tin oxide and hydrous cerium oxide was coated in an amount of 0.05% by weight as calculated as $CeO_2$.

N: The treatment of Example 5 was repeated, except that the coating treatment with hydrous aluminum oxide was omitted.

TEST EXAMPLE 1

The performances of the titanium dioxide pigments A to N mentioned in the preceding Examples and Comparative Examples were tested to obtain the results shown in Table 1.

treated steel plate (7 cm×15 cm) so as to have a thickness (as a dry coating) of about 60μ and baked at 130° C. for 30 minutes. Thus, a white colored test panel was obtained.

Measurement of Specular Gloss

The initial gloss (20°—20° and 60°—60° specular glosses) of the white colored test panel was measured by means of a gloss meter.

Evaluation of Durability

Gloss retention was evaluated by subjecting the white colored test panel to an accelerated weathering (water was sprayed for 12 minutes every 60 minute exposure, and the black panel temperature was 63±3° C.) in a carbon arc type sun-shine weather-o-meter and measuring the 60°—60° specular gloss at predetermined time intervals. Chalking resistance was evaluated based on the starting time of chalking as well as the extent of chalking appearing on the coating surface after exposure for 600 hours which was measured according to the standard for evaluation of paint film of Japan Paint Inspecting Association. That the extent of chalking is 10 means that chalking does not appear, and a smaller number means that the extent of chalking is the greater.

TEST EXAMPLE 2

The titanium dioxide pigment A of this invention obtained in Example 1 was mixed with a solution of resin mixture consisting of a water soluble acrylic resin and a water soluble melamine resin (3/1 by weight) and dispersed in the solution by means of a ball mill to obtain a coating material. Then, it was coated on an aluminum plate (7 cm×15 cm) so as to have a thickness of about 60μ (as a dry film) and baked at 150° C. for 30 minutes to obtain a white colored test panel.

Gloss and durability of this white colored test panel

TABLE 1

|  | Pigment | Initial gloss 20°—20° | Initial gloss 60°—60° | Durability Gloss retention (60°—60° gloss) 360 hrs | Durability Gloss retention (60°—60° gloss) 560 hrs | Durability Chalking resistance Starting time of chalking (hrs) | Durability Chalking resistance Chalking degree after 600 hrs |
|---|---|---|---|---|---|---|---|
| Example | A | 81 | 89 | 83 | 55 | 680 | 10 |
|  | B | 78 | 88 | 79 | 50 | 680 | 10 |
|  | C | 80 | 88 | 80 | 50 | 640 | 10 |
|  | D | 82 | 90 | 83 | 54 | 680 | 10 |
|  | E | 79 | 89 | 81 | 55 | 720 | 10 |
| Comparative | F | 73 | 88 | 65 | 40 | 560 | 8 |
| Example | G | 78 | 88 | 60 | 35 | 480 | 4 |
|  | H | 74 | 88 | 62 | 40 | 520 | 4 |
|  | I | 76 | 88 | 67 | 42 | 560 | 8 |
|  | J | 70 | 86 | 65 | 42 | 560 | 6 |
|  | K | 70 | 86 | 67 | 45 | 600 | 8 |
|  | L | 72 | 87 | 62 | 38 | 520 | 6 |
|  | M | 75 | 88 | 75 | 46 | 600 | 8 |
|  | N | 76 | 88 | 67 | 45 | 600 | 8 |

It is apparent from Table 1 that the titanium dioxide pigment of this invention exhibits excellent performances in both gloss and durability when used in a solvent type coating material.

The performances mentioned in Table 1 were evaluated by the following procedures:

Preparation of Test Panel

A titanium dioxide pigment was mixed with a coconut oil-modified short oil alkyd resin/butylated melamine resin (7/3 by weight varnish and dispersed in the varnish by means of a paint shaker to give a coating material. Then, it was coated on a zinc phosphatewere evaluated in the same manner as in Test Example 1. The results are shown in Table 2.

TABLE 2

|  | Dispersibility Time (hr) | Initial gloss 20°—20° | Initial gloss 60°—60° | Chalking resistance Chalking degree after 600 hrs |
|---|---|---|---|---|
| Product of this invention | 5 | 75 | 88 | 10 |
| Control A | 13 | 51 | 81 | 8 |

TABLE 2-continued

| | Dispersi-bility Time (hr) | Initial gloss 20°—20° | 60°—60° | Chalking resistance Chalking degree after 600 hrs |
|---|---|---|---|---|
| Control B | 6 | 75 | 88 | 4 |

Note:
Dispersability: The time required until the coarse particle fraction in the paint dispersion reaches a size of 7μ or less. (A shorter time means a better initial dispersibility.)
Control: A and B are both commercial products produced by the chloride process. A is of the durable grade (coated with $SiO_2$ and $Al_2O_3$), and B is of the general purpose grade for water soluble paint (coated with $Al_2O_3$).

It is apparent from Table 2 that the titanium dioxide pigment of this invention exhibits excellent performances in respect of dispersibility into water soluble type paints, gloss and durability.

What is claimed is:

1. A titanium dioxide pigment which consists of either (A) (1) pigmentary titanium dioxide core particle, (2) an inner coating formed of 0.1-3% by weight, based on the weight of said core particle and calculated as $SnO_2$, of hydrous tin oxide and 0.1-5% by weight, based on the weight of said core particle and calculated as $ZrO_2$, of hydrous zirconium oxide and (3) an outer coating formed of 0.1-8% by weight, based on the weight of said core particle and calculated as $Al_2O_3$, of hydrous aluminum oxide or (B) (1), (2), (3) and a coating of an organic agent adsorbed around the outer coating of hydrous aluminum oxide, said pigment having a high photochemical durability and excellent gloss and dispersibility.

2. A titanium dioxide pigment according to claim 1, wherein the amount of the coating of hydrous tin oxide is 0.2-1.5% by weight based on the weight of said core particle and calculated as $SnO_2$.

3. A titanium dioxide pigment according to claim 1, wherein the amount of the coating of hydrous tin oxide is 0.3-1% by weight based on the weight of said core particle and calculated as $SnO_2$.

4. A titanium dioxide pigment according to claim 1, wherein the amount of the coating of hydrous zirconium oxide is 0.3—3% by weight based on the weight of said core particle and calculated as $ZrO_2$.

5. A titanium dioxide pigment according to claim 1, wherein the amount of the coating of hydrous zirconium oxide is 0.5-2% by weight based on the weight of said core particle and calculated as $ZrO_2$.

6. A titanium dioxide pigment according to claim 1, wherein the amount of the coating of hydrous oxide of aluminum is 0.3-5% by weight based on the weight of said core particle and calculated as $Al_2O_3$.

7. A titanium dioxide pigment according to claim 1, wherein the amount of the coating of hydrous aluminum oxide is 0.5-3% by weight based on the weight of said core particle and calculated as $Al_2O_3$.

8. A titanium dioxide pigment according to claim 1, wherein the weight ratio of the amounts of the coatings of the hydrous oxides of tin, zirconium and aluminum, calculated as $SnO_2:ZrO_2:Al_2O_3$, is 1:1-3:1-8.

9. A titanium dioxide pigment according to claim 1, wherein the weight ratio of the amounts of the coatings of hydrous oxides of tin, zirconium and aluminum, calculated as $SnO_2:ZrO_2:Al_2O_3$, is 1:1-2:2-6.

10. A titanium dioxide pigment having the (B) composition according to any one of claims 2 to 9.

11. A titanium dioxide pigment according to claim 10, wherein said organic agent is a polyol or an alkanolamine.

12. A process for producing a titanium dioxide pigment which consists of (1) forming an aqueous slurry of pigmentary titanium dioxide core particles, (2) adding, to said slurry, water soluble compounds of tin and zirconium and adding an acid or an alkali for neutralizing said slurry to pH 6-8 to precipitate hydrous oxides of tin and zirconium on the surfaces of said core particles, thereby forming an inner coating consisting of 0.1-3% by weight of tin oxide and 0.1-5% by weight of zirconium oxide, both based on the weight of said core particles and calculated as $SnO_2$ and $ZrO_2$, respectively, and then (3) adding a water soluble compound of aluminum and adding an acid or an alkali for neutralizing said slurry to pH 6-8 to precipitate hydrous aluminum oxide, thereby forming an outer coating consisting of 0.1-8% by weight of aluminum oxide, based on the weight of said core particles and calculated as $Al_2O_3$ or after (3) adsorbing an organic agent thereon.

13. A process for producing titanium dioxide pigment according to claim 12, wherein said tin compound is at least one member selected from the group consisting of tin chloride, tin sulfate, tin acetate, tin oxychloride, potassium stannate and sodium stannate.

14. A process for producing titanium dioxide pigment according to claim 12, wherein said zirconium compound is at least one member selected from the group consisting of zirconium chloride, zirconium sulfate, zirconium nitrate, zirconium acetate, zirconium carbonate, zirconium oxychloride and zirconium oxysulfate.

15. A process for producing titanium dioxide pigment according to claim 12, wherein said aluminum compound is at least one member selected from the group consisting of alkali aluminates, aluminum chloride and aluminum sulfate.

16. A process for producing titanium dioxide pigment according to claim 12, wherein tin chloride is used as said tin compound, zirconium sulfate is used as said zirconium compound and sodium aluminate is used as said aluminum compound.

17. A process for producing titanium dioxide pigment according to claim 12, wherein, in step (1), the slurry of pigmentary titanium dioxide core particles is adjusted to an acidic condition and, in step (2), an aqueous solution of acidic tin compound and an aqueous solution of acidic zirconium compound are added to the slurry, and the pH value of the slurry is then adjusted to 6-8 by adding an aqueous solution of an alkali.

18. A process for producing titanium dioxide pigment according to claim 12, wherein an inner coating is formed by adding a water soluble compound of tin to the aqueous slurry of the core particles, adjusting the pH value of said slurry to precipitate at least a part of the tin as hydrous oxide onto the surface of said core particle, then adding a water soluble compound of zirconium and adjusting the pH value of said slurry to precipitate hydrous zirconium oxide.

19. A process for producing titanium dioxide pigment according to claim 12, wherein the coating treatment with hydrous oxides of tin, zirconium and aluminum is carried out while maintaining the temperature of said slurry at 40°-90° C.

20. A titanium dioxide pigment consisting of the (A) composition set forth in claim 1.

21. A titanium dioxide pigment consisting of the (B) composition of claim 1.

22. A titanium dioxide pigment according to claim 21 wherein the organic agent is a polyol or an alkanolamine.

* * * * *